(12) United States Patent
Yoshino et al.

(10) Patent No.: US 9,809,277 B2
(45) Date of Patent: Nov. 7, 2017

(54) FRICTIONAL PROPULSION DEVICE AND OMNI-DIRECTIONAL VEHICLE

(71) Applicant: HONDA MOTOR CO., LTD., Minato-ku, Tokyo (JP)

(72) Inventors: Tsutomu Yoshino, Wako (JP); Wataru Yada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 17 days.

(21) Appl. No.: 15/097,051

(22) Filed: Apr. 12, 2016

(65) Prior Publication Data

US 2016/0304163 A1    Oct. 20, 2016

(30) Foreign Application Priority Data

Apr. 16, 2015 (JP) ................. 2015-084148

(51) Int. Cl.
| | | |
|---|---|---|
| *B62M 13/00* | (2010.01) | |
| *B62K 1/00* | (2006.01) | |
| *B60B 19/00* | (2006.01) | |
| *B62K 11/02* | (2006.01) | |
| *B62K 17/00* | (2006.01) | |
| *B62K 11/00* | (2006.01) | |

(52) U.S. Cl.
CPC .......... *B62M 13/00* (2013.01); *B60B 19/003* (2013.01); *B62K 1/00* (2013.01); *B62K 11/007* (2016.11); *B62K 11/02* (2013.01); *B62K 17/00* (2013.01)

(58) Field of Classification Search
CPC ...... B62M 13/00; B62M 13/02; B62M 13/04; B62K 11/007; B62K 1/00; B60B 19/003
See application file for complete search history.

(56) References Cited

U.S. PATENT DOCUMENTS

| | | | | |
|---|---|---|---|---|
| 8,220,571 B2 * | 7/2012 | Gomi | ...... | B62K 1/00 |
| | | | | 180/21 |
| 8,353,378 B2 * | 1/2013 | Gomi | ...... | B60B 19/003 |
| | | | | 180/21 |
| 8,356,681 B2 * | 1/2013 | Gomi | ...... | B60B 19/003 |
| | | | | 180/20 |

(Continued)

FOREIGN PATENT DOCUMENTS

| | | |
|---|---|---|
| JP | 2011-063214 A | 3/2011 |
| JP | 2011-063215 A | 3/2011 |

*Primary Examiner* — Jacob D Knutson
*Assistant Examiner* — Michael R Stabley
(74) *Attorney, Agent, or Firm* — Carrier Blackman & Associates, P.C.; Joseph P. Carrier; William D. Blackman (57) ABSTRACT

In a frictional propulsion device comprising a frame, a main wheel including driven rollers rotatably supported by an annular core member about a tangential direction and a pair of drive disks each carrying drive rollers rotatable about a rotational center line at an angle with respect to both a tangential line of the drive disk and the rotational center line of the drive disk such that the drive rollers at least partly engage the driven rollers, each drive disk includes a hub rotatably supported by the support shaft, a disk member attached to a peripheral part of the hub, and holder beams arranged circumferentially between the hub and the disk member such that each holder beam is attached to the hub at a first end thereof and to the disk member at a second end thereof, each drive roller being rotatably supported by a corresponding adjoining pair of holder beams.

12 Claims, 9 Drawing Sheets

(56) References Cited

U.S. PATENT DOCUMENTS

| | | | | |
|---|---|---|---|---|
| 8,403,084 B2* | 3/2013 | Gomi | ............... | B60B 3/048 |
| | | | | 180/10 |
| 8,499,865 B2* | 8/2013 | Takenaka | ............. | B60B 19/003 |
| | | | | 180/21 |
| 8,567,535 B2* | 10/2013 | Takenaka | ............... | B62K 1/00 |
| | | | | 180/21 |
| 8,645,030 B2* | 2/2014 | Kobashi | ............... | B60B 3/048 |
| | | | | 701/49 |
| 8,776,934 B2* | 7/2014 | Muto | ............... | B62H 1/12 |
| | | | | 180/21 |
| 9,199,685 B2* | 12/2015 | Shimizu | ............... | B62K 3/007 |
| 2011/0070997 A1* | 3/2011 | Gomi | ............... | B60B 9/06 |
| | | | | 476/66 |
| 2012/0032496 A1* | 2/2012 | Takenaka | ............. | B60B 19/003 |
| | | | | 301/5.23 |
| 2014/0353051 A1* | 12/2014 | Yada | ............... | B62K 11/007 |
| | | | | 180/6.2 |
| 2015/0129327 A1* | 5/2015 | Yoshino | ............... | B60B 19/003 |
| | | | | 180/6.5 |

* cited by examiner

FRICTIONAL PROPULSION DEVICE AND OMNI-DIRECTIONAL VEHICLE

TECHNICAL FIELD

The present invention relates to a frictional propulsion device and an omni-directional vehicle, and in particular to a frictional propulsion device that can be favorably used in an omni-directional vehicle and an omni-directional vehicle equipped with such a frictional propulsion device.

BACKGROUND ART

A known frictional propulsion device for an omni-directional vehicle comprises a main wheel including an annular core member and a plurality of driven rollers (free rollers) fitted on the annular core such that each driven roller may be freely rotatable around the tangential direction of the annular core member at the corresponding position, and a pair of drive disks provided on either side of the main wheel each including a disk member and a plurality of drive rollers (free rollers) arranged along the outer periphery of the disk member and engaging the driven rollers of the main wheel so as to be each rotatable around a rotational center line at an angle to both the lateral direction and the radial direction. See JP2011-63214A and JP2011-63215A, for instance.

In such a structure, it is important that the structure for supporting the drive rollers (free rollers) on each drive disk is mechanically stable, compact and economical. In the structure disclosed in JP2011-63214A, each drive disk is provided with a plurality of slots along the outer periphery thereof to rotatably support the respective drive rollers (free rollers). Each drive roller is received in the corresponding slot and rotatably supported via a pivot shaft so as to be rotatable within the slot.

In the structure disclosed in JP2011-63215A, each drive roller is rotatably supported by a bracket, and the bracket is in turn fitted into a corresponding groove formed in the drive disk. An annular side plate is attached to the drive disk to firmly retain each bracket in the groove.

According to the structure disclosed in JP2011-63214A, a large number of slots have to be formed in the disk member by milling, and owing to the three-dimensionally slanted configuration of each slot, a highly complex milling process is required, and this increases the manufacturing cost. Furthermore, because each drive roller is provided with a bearing, the assembling of the drive rollers requires considerable work hours. For the details of the assembly work, reference should be made to JP2011-63215A.

According to the structure disclosed in JP2011-63215A, a large number of grooves have to be formed in the disk member by milling, and this also involves a highly complex milling process. Furthermore, each bracket is retained by the corresponding groove in the manner of a cantilever so that it is difficult to achieve an adequate mechanical strength without increasing the overall size.

Therefore, there is a need for a drive disk design which is mechanically stable, compact and economical.

BRIEF SUMMARY OF THE INVENTION

In view of such problems of the prior art, a primary object of the present invention is to provide a frictional propulsion device provided with a drive disk structure which is mechanically stable, compact and economical.

A second object of the present invention is to provide an omni-directional vehicle equipped with such a frictional propulsion device.

To achieve such objects, the present invention provides a frictional propulsion device, comprising: a frame (10); a main wheel (30) including an annular core member (32) having a laterally extending central axial center line and a plurality of driven rollers (60) each rotatably supported on the annular core member about a tangential line of the annular core member; a support shaft (22) supported by the frame and extending laterally across a hollow interior of the main wheel; a pair of drive disks (70) rotatably supported by the support shaft on either side of the main wheel, the drive disks being individually rotatable around a common central axial line; and a plurality of drive rollers (78) arranged along a peripheral part of each drive disk and each rotatably supported by the drive disk about a rotational center line at an angle with respect to both a tangential line of the drive disk and the rotational center line of the drive disk, at least part of the drive rollers engaging the driven rollers of the main wheel; wherein each drive disk includes, a hub (72) rotatably supported by the support shaft, a disk member (74) attached to a peripheral part of the hub, and a plurality of holder beams (76) arranged circumferentially between the hub and the disk member such that each holder beam is attached to the hub at a first end (76A) thereof and to the disk member at a second end (76B) thereof, each drive roller being rotatably supported by a corresponding adjoining pair of holder beams.

In this arrangement, each drive disk is an assembly consisting of the hub, the disk member and the holder beams, and the holder beams are connected between the hub and the disk member while the disk member is directly connected to the hub at a different location. Therefore, the three elements of the assembly cooperate one another in such a manner that a highly robust assembly is formed. For instance, the holder beams may serve as a brace structure provided between the disk member and the hub. In particular, each holder beam is thus formed as a beam supported at the both ends thereof by the disk member and the hub respectively so that the drive rollers can be rotatably supported in a highly stable manner.

Preferably, each holder beam is detachably attached to the hub and the disk member by using fasteners.

Thereby, the serving of the drive rollers can be facilitated.

Preferably, the holder beams are identically shaped to one another, and are same in number as the drive rollers.

Thereby, the variations in the component parts can be minimized, and the manufacturing cost can be reduced.

According to a preferred embodiment of the present invention, each hub (72) includes a cylindrical part (72B) rotatably supported by the frame and a radial flange (72A) extending radially outward from an outer periphery of the cylindrical part, each holder beam being connected between the radial flange of the hub and the disk member. Thereby, each holder beam is favorably supported by the flange and the disk member at the two ends thereof so that a high mechanical strength and a high stiffness can be achieved by using a simple structure.

According to a particularly preferred embodiment of the present invention, each holder beam consists of an elongated rod member, and the first end and the second end of the rod member abut a first position on the flange of the hub and a second position on the disk member, respectively, at respective axial end surfaces (76D, 76E) of the rod member.

Thereby, the holder beams can be arranged between the disk member and the flange of the hub at a high density along the circumferential direction.

Preferably, the first position and the corresponding second position are offset relative to each other in both radial and circumferential directions.

Thereby, the holder beams may be made of simple slightly bent rod members so that the manufacturing cost can be minimized and the circumferential density of the holder beams can be maximized without interfering one another.

A particularly simple structure can be achieved in an arrangement wherein the end surface (76D) of the first end (76A) of the holder beam is provided with a first female thread hole (113), and a first screw (112) is passed through a hole provided in the flange of the hub and threaded into the first female thread hole, and wherein the end surface (76E) of the second end (76B) of the holder beam is provided with a second female thread hole (115), and a second screw (114) is passed through a hole provided in the disk member and threaded into the second female thread hole.

Preferably, the flange and the disk member are substantially parallel to each other, and an intermediate part of each holder beam is provided with a pair of bearing holes (77) for rotatably supporting pivot shafts (116) of the adjoining drive rollers. Thereby, the structure of each drive disk can be simplified.

According to a certain aspect of the present invention, a flanged bush (118) is inserted in each bearing hole, and a side face of each drive roller is supported by a flange of the flanged bush. The flanges serve as thrust bearings for the drive rollers so that the friction loss can be minimized, and a smooth operation can be achieved.

To minimize the play that may exist between the side faces of the opposing flanges of the flanged bushes, a shim (120) may be positioned between the opposing surfaces of the flange and the drive roller.

Thus, the present invention provides a drive disk design which is mechanically stable, compact and economical. In particular, according to the present invention, each drive disk is simplified in structure without requiring slots or grooves to be formed in the disk member by machining so that the manufacturing cost can be minimized.

DESCRIPTION OF THE PREFERRED EMBODIMENT(S)

A preferred embodiment of the present invention is described in the following with reference to FIGS. 1 to 8.

Figure 1:
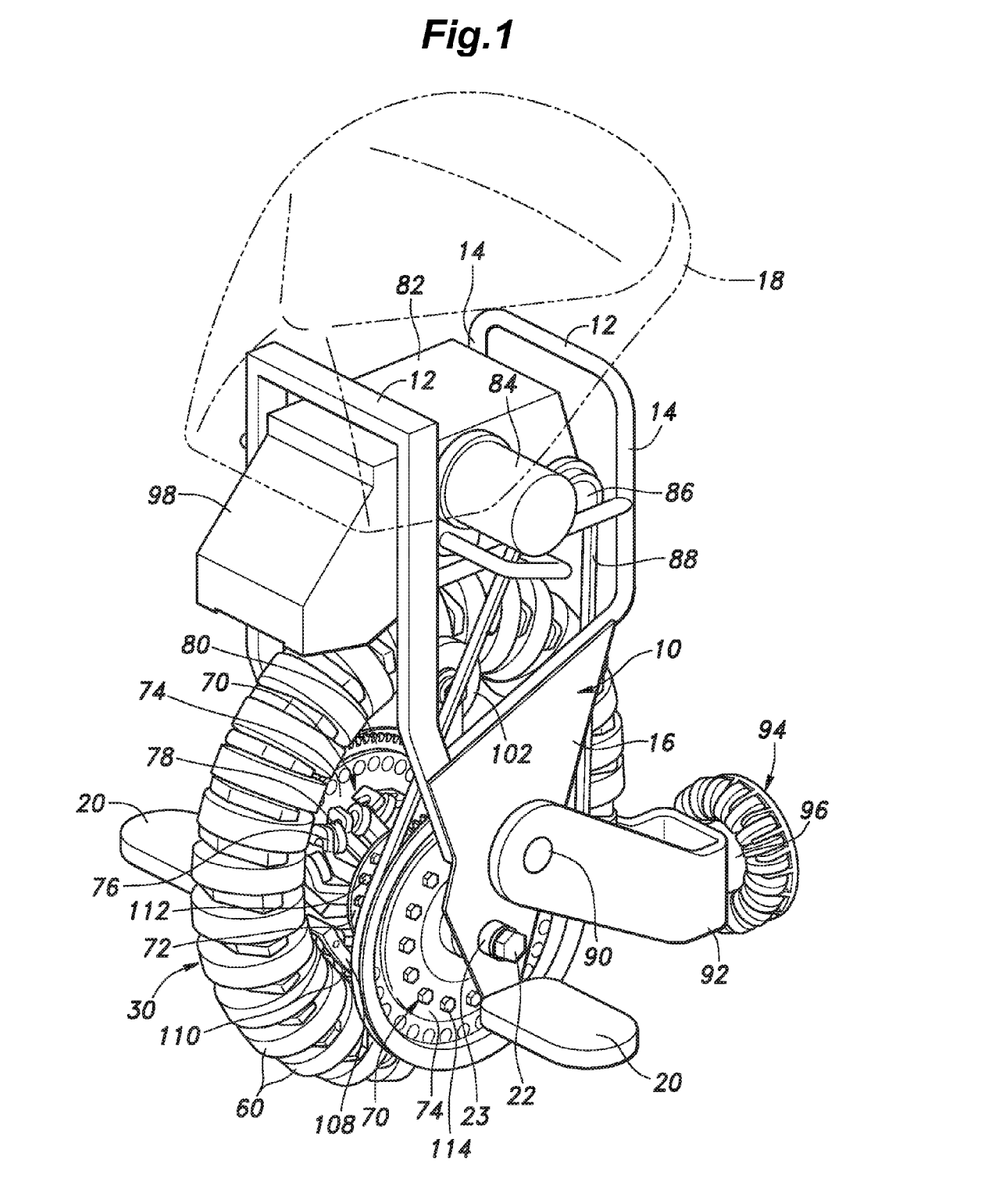
FIG. 1 is a perspective view of an omni-directional vehicle of an inverted pendulum type using a frictional propulsion device according to the present invention.

As shown in FIG. 1, the inverted pendulum vehicle of the illustrated embodiment (omni-directional vehicle) comprises a vehicle body frame 10. The vehicle body frame 10 comprises a pair of upper cross members 12, and a pair of side leg members 14 each having a pair of bifurcated upper parts connected to the lateral ends of the corresponding cross members 12, respectively, and a lower part connected to a triangular lower support plate 16 extending along either side of the vehicle. The upper cross members 12 support a saddle 18 for seating the rider, and each lower support plate 16 is fitted with a foot rest 20 for supporting the corresponding foot of the rider.

A main wheel 30 and a pair of drive disks 70 flanking the main wheel 30 are disposed between the lower parts of the two leg members 14 or the lower support plates 16.

Figure 2:
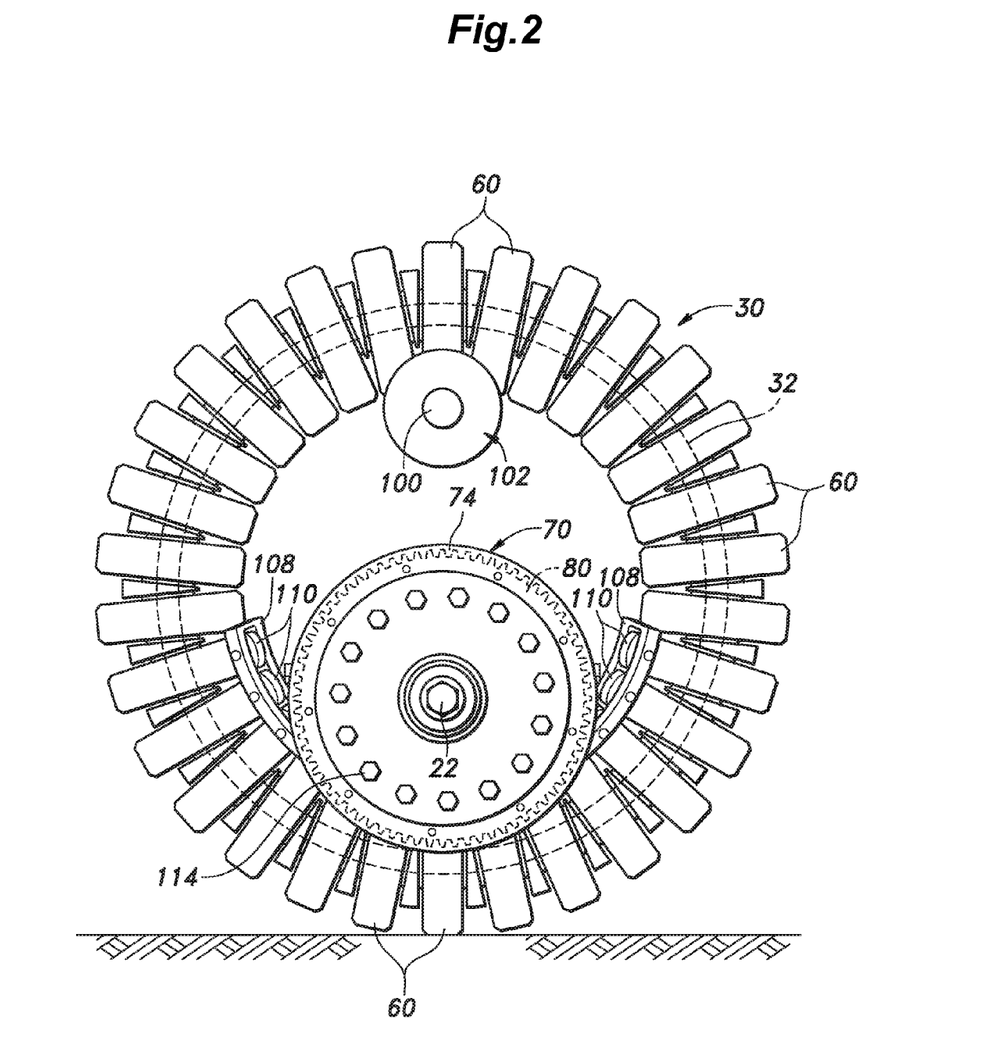
FIG. 2 is a side view of the frictional propulsion device.
Figure 3:
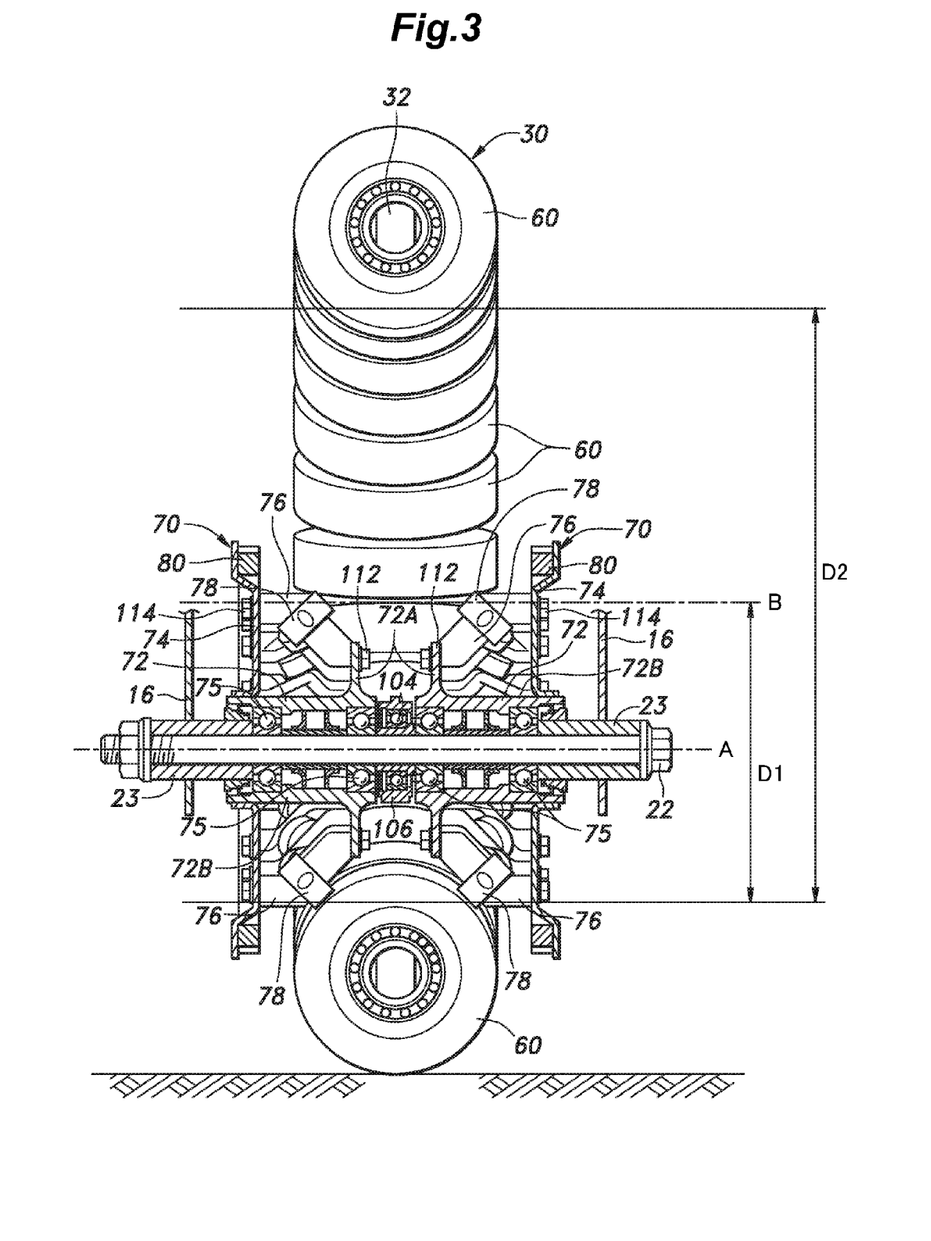
FIG. 3 is a sectional front view of the frictional propulsion device.
Figure 4:
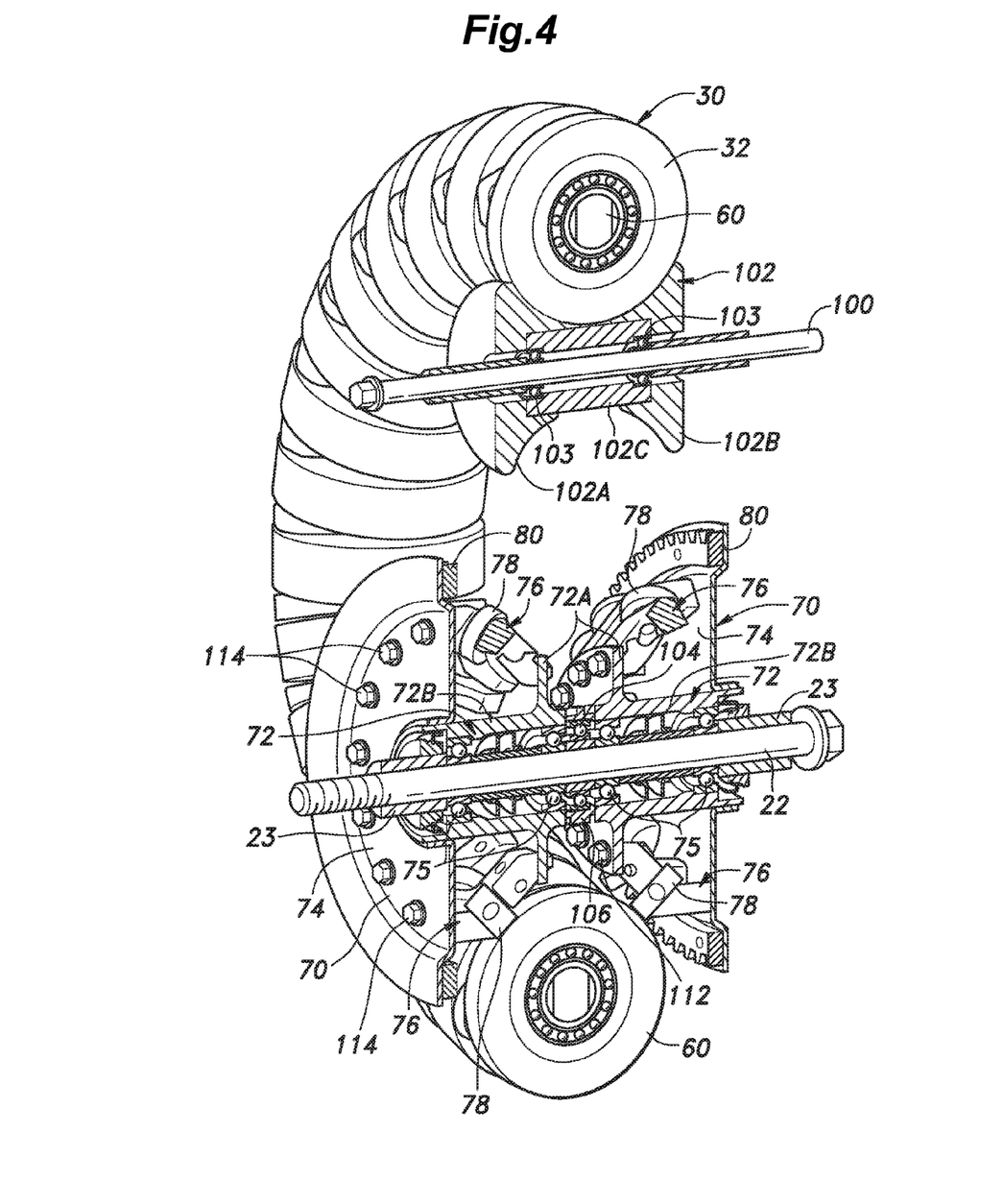
FIG. 4 is a sectional perspective view of the frictional propulsion device.

As shown in FIGS. 2 to 4, the main wheel 30 includes an annular core member 32 having a central axial line extending laterally (horizontally) and a plurality of driven rollers (free rollers) 60 fitted on the annular core member 32 like beads of a rosary. Each driven roller 60 is rotatable around the tangential line of the annular core member 32 at the point where the particular driven roller 60 is located.

As shown in FIGS. 1 to 5, the two drive disks 70 are symmetric to each other about the central major plane of the main wheel 30, and are each provided with a hub 72 and a disk member 74 connected coaxially and outboard to the hub 72. Each hub 72 includes a cylindrical part 72B and a radial flange 72A extending radially outward from the part of the cylindrical part 72B adjoining the inboard end thereof. A pair of such hubs 72 are arranged symmetric to each other about the main wheel 30, and are each configured similar to the hub of a motorcycle.

Figure 5:
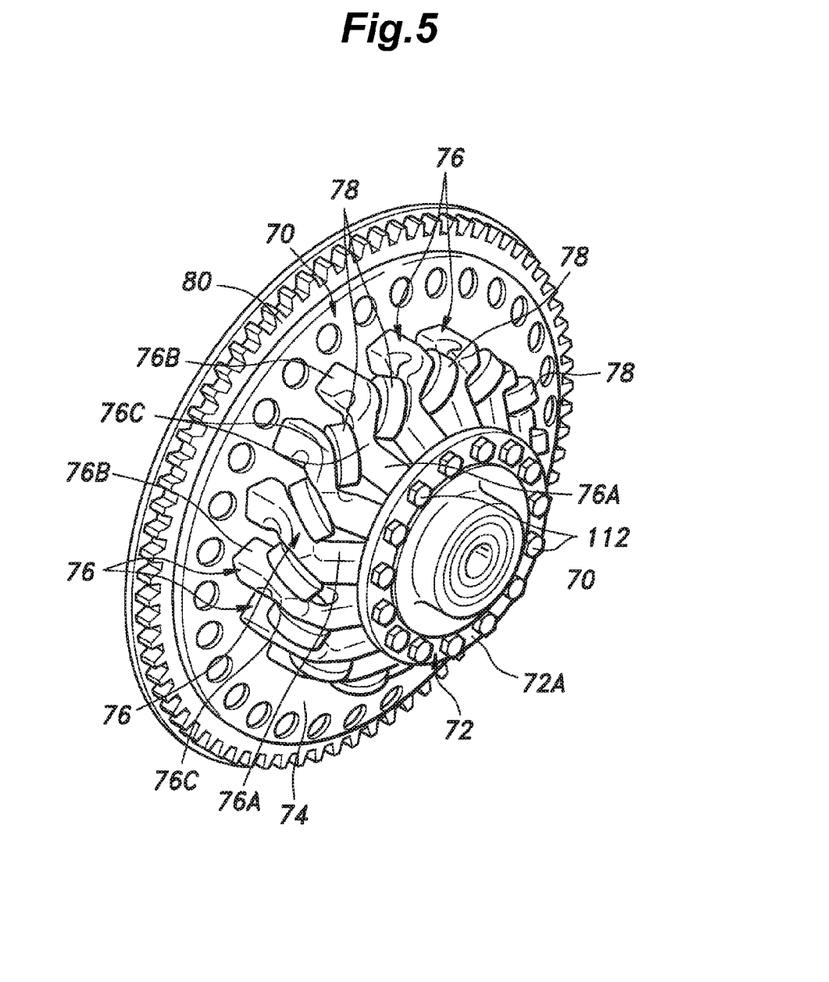
FIG. 5 is a perspective view of a drive disk assembly.
Figure 6:
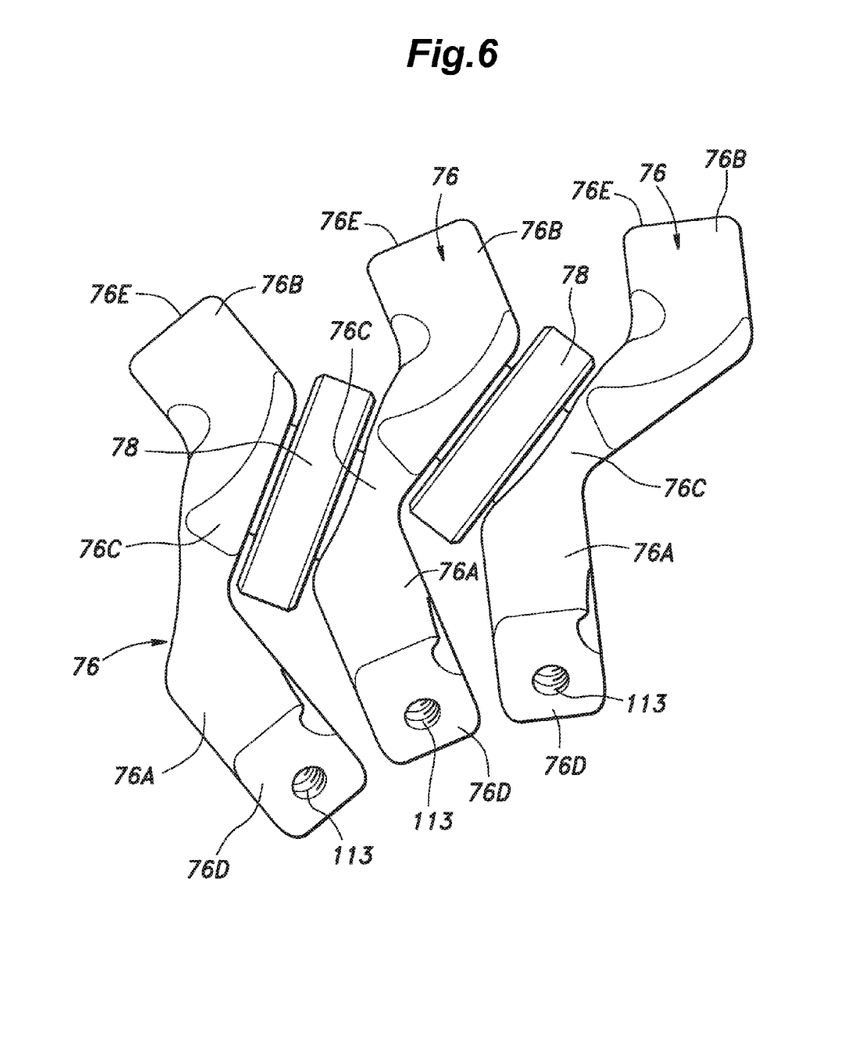
FIG. 6 is an enlarged fragmentary side view of the drive disk assembly.

A plurality of holder beams 76 for supporting the drive rollers 78 are provided between the radial flange 72A of the hub 72 and the outer peripheral part of the disk member 74, and are arranged along a circle concentric to the support shaft 22. A drive roller (free roller) 78 is rotatably supported between each pair of adjoining holder beams 76 around a rotational center line which is at an angle to both the radial direction and the lateral direction.

As shown in FIGS. 3 to 5, each disk member 74 consists of a stamp formed annular member made of sheet metal, and is coaxially attached to the outboard end of the hub 72 at the inner periphery thereof. Thus, the flange 72A is spaced apart from the disk member 74 in the axial direction in a mutually parallel relationship.

Each holder beam 76 is made of a bent rod member having a substantially rectangular cross section and made of forged or cast aluminum or molded plastic member, and is identically shaped to one another. The holder beams 76 are arranged at a regular angular interval around the central axial line A of the support shaft 22 in a concentric relationship like the teeth of a bevel gear. As shown in FIGS. 5 to 8, each holder beam 76 includes a first rod segment 76A attached to the flange 72A, a second rod segment 76B attached to the disk member 74 and an intermediate part 72C joining the opposing ends of the rod segments 76A and 76B. These rod segments 76A and 76B extend substantially perpendicular to abutting parts of the flange 72A or the disk member 74, as the case may be, and abut the flange 72A or the disk member 74 with the end surfaces 76D and 76E of the rod segments 76A and 76B. The rod segments 76A and 76B of each holder beam 76 are circumferentially offset from each other. Furthermore, the ends of the rod segments 76A and 76B attached to the flange 72A or the disk member 74, respectively, are radially offset from each other. Therefore, each intermediate part 76C extends in a three dimensionally tilted direction with respect to the axial center line A of the support shaft 22 and the radial directions.

Figure 8:
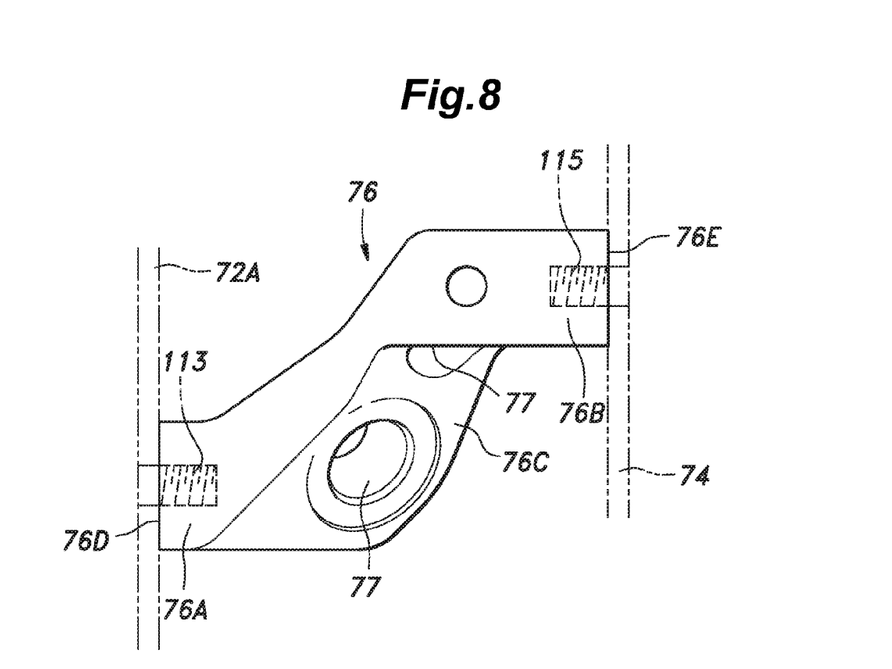
FIG. 8 is an enlarged side view of a holder beams for supporting drive rollers.

The free end of each first rod segment 76A or the first end surface 76D is formed with a threaded hole 113 extending perpendicularly to the first end surface 76D, and the free end of each second rod segment 76B or the second end surface 76E is formed with a threaded hole 115 extending perpendicularly to the second end surface 76E. Preferably, the rod segments 76A and 76B extend substantially perpendicularly to the flange 72A or the disk member 74, but may also be at an angle to the flange 72A or the disk member 74.

Each first rod segment 76A is detachably joined to the flange 72A by a threaded bolt 112 passed through a hole formed in the flange 72A and threaded into the threaded hole 113. Each second rod segment 76B is detachably joined to the disk member 74 by a threaded bolt 114 passed through a hole formed in the flange 72A and threaded into the threaded hole 115. In other words, the hub 72, the disk member 74 and the holder beams 76 are detachably joined to one another by the threaded bolts 112 and 114.

Thus, the holder beams 76 abut the opposing surfaces of the disk member 74 and the flange 72A of the hub 72 at the respective end surfaces 76D and 76E, and are fixed thereto by the threaded bolts 112 and 114 at the respective ends. As each holder beam 76 is firmly supported at the both ends thereof in the manner of a beam supported at both ends, a high stiffness and a high mechanical strength can be achieved without any difficulty.

The intermediate part 76C of each holder beam 76 is formed with a pair of bearing holes 77 for supporting the corresponding drive rollers 78. These bearing holes 77 are slightly angled in a three dimensional direction so that all of the drive rollers 78 are tilted in a prescribed fashion and are symmetric around the central axial line A.

Figure 7:
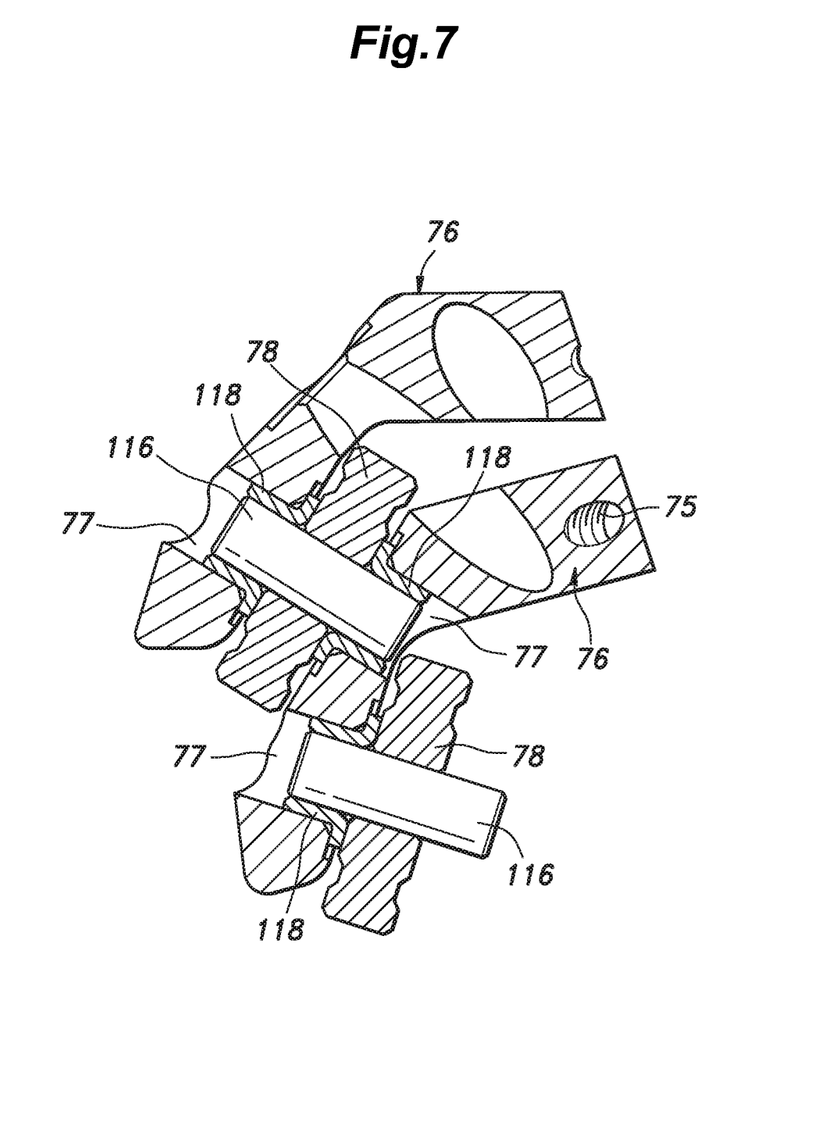
FIG. 7 is an enlarged fragmentary sectional view of the drive disk assembly.

As shown in FIG. 7, each drive roller 78 is centrally fitted with a roller shaft (pivot shaft) 116 which projects from either side of the drive roller 78. Each end of the roller shaft 116 is rotatably received in the corresponding bearing hole 77 of the corresponding holder beam 76 via a flanged bush 118 so that the roller shaft 116 of each drive roller is supported by the adjoining holder beams 76 at the two ends thereof. Therefore, the drive roller 78 can be supported with a high mechanically stiffness and strength.

Thus, the drive rollers 78 can be arranged along a circle concentric to the central axial line A in the manner of the teeth of a bevel gear, and the rotational center lines of the drive rollers 78 are directed in a direction which is at an angle to both the radial direction and the central axial direction in an arrangement symmetric about the central axial line A. Owing to the curved configuration of the holder beams 76, the holder beams 76 can be positioned at a high density without interfering one another in the circumferential direction so that the drive rollers 78 can be arranged in a correspondingly high density.

Each lower support plate 16 is fixedly fitted with a sleeve 23 which in turn fixedly supports the corresponding end of the support shaft 22. The support shaft 22 is passed though the hollow interior of the two hubs 72, and support the hubs 72 individually via ball bearings 75, respectively. In other words, the body frame 10 supports the two hubs 72 and hence the drive disks 70 in a rotatable manner around the common central axial line A. This central axial line A is vertically offset from the central axial line B of the main wheel 30 as will be discussed hereinafter.

Here, a hypothetical circle defined by the points on the drive disk 70 at which the drive rollers 78 contact the driven rollers 60 is called as a drive side contact circle, and a hypothetical circle defined by the points on the main wheel 30 at which the driven rollers 60 contact the drive rollers 78 is called as a driven side contact circle.

In the illustrated embodiment, the diameter D1 of the drive side contact circle is smaller than the diameter D2 of the driven side contact circle. Also, as the drive disks 70 and the support shaft 22 are supported by the common support shaft 22 extending laterally (horizontally), the plane of the drive side contact circle is in parallel with the plane of the driven side contact circle.

Because D1<D2, the drive disks 70 are radially (vertically) offset from the main wheel 30 so that only those drive rollers 78 adjoining the driven rollers 60 are in contact with the driven rollers 60. In other words, as the central axial line A of the drive disks 70 is downwardly offset relative to the main wheel 30, only those drive rollers 78 which are located in a lower part of the drive disks 70 engage those driven rollers 60 located in a lower part of the main wheel 30. In this case, the drive rollers 78 and the driven rollers 60 are disposed in a symmetric relationship about a vertical line passing through the road contact point of the main wheel 30 when viewed from sideways. This is advantageous because only those driven rollers 60 engaging the road surface are effective in propelling the vehicle, and only those drive rollers 78 effective in driving the driven rollers 60 engaging the road surface are required to be driven while the remaining drive rollers 78 not contributing the propulsion of the vehicle are left idle without consuming any energy.

The drive rollers 78 engaging the driven rollers 60 of the main wheel 30 are urged downward or against the driven rollers 60 under the weight of the vehicle and the rider seated on the saddle 18. Typically, one or two of the driven rollers 60 of the main wheel 30 engage the road surface, but when the loading is great, three or more of the driven rollers 60 may engage the road surface owing to the elastic deformation of the driven rollers 60.

As shown in FIGS. 2 and 4, the body frame 10 is provided with an upper shaft 100 which extends laterally through the main wheel 30 in an upper part thereof and supports an hourglass shaped idler roller 102 via a pair of ball bearings 103. The idler roller 102 includes a pair of frusto-conical end members 102A and 102B opposing each other with the narrower ends thereof and a cylindrical part 102C coaxially connecting the narrower ends of the frusto-conical end members 102A and 102B so as to define the hourglass shape. The narrow intermediate part of the idler roller 102 engages the upper part of the inner periphery of the main wheel 30. Thereby, the main wheel 30 is restrained against a roll movement thereof or prevented from tilting sideways. The driven rollers 60 engaged by the idler roller 102 are idle so that substantially no frictional resistance is caused by the idler roller 102.

If desired, a biasing spring (not shown in the drawings) may be provided on the body frame 10 so that the idler roller 102 may be resiliently urged against the driven rollers 60 in the uppermost part of the main wheel 30.

As shown in FIGS. 3 and 4, the central part of the support shaft 22 rotatably supports a middle part of an arm 106 via a ball bearing 104, between the opposing ends of the cylindrical parts 72B of the two hubs 72. The arm 106 extends in the both forward and rearward directions from the central part thereof, and the forward and rearward ends of the arm 106 are each bifurcated into a pair of arcuate arm ends extending in the longitudinal direction on either side of the central plane of the main wheel 30. Each arm end is provided with a roller holder 108 that holds a plurality of free rollers (guide rollers) 110 disposed in tandem to one another and engaging the inner periphery of the main wheel 30. Thus, two rows of free rollers 110 are arranged along the inner periphery of the main wheel 30 and engage the inner periphery of the main wheel 30. In particular, the free rollers 110 engage those driven rollers 60 that are located adjacent to the driven rollers 60 that are engaged by the drive rollers 78 and engaging the road surface, and are therefore idle.

The main wheel 30 is thus supported by the two sets of drive rollers 78 and the free rollers 110 at the lower part thereof on either side against lateral and yaw movements and by the idler roller 102 at the upper end thereof against lateral movement so that the main wheel 30 can be maintained in the upright attitude without wobbling either in the lateral direction, in the roll direction or in the yaw direction. Furthermore, when the body frame 10 is lifted off the ground, the idler roller 102 prevents the main wheel 30 from sagging down from the body frame 10.

A driven pulley 80 is coaxially attached to the inner side of each disk member 74. The driven pulley 80 in this case consists of a toothed pulley, but may also consist of a regular V-pulley, flat pulley or a sprocket wheel. A gear box 82 is mounted in an upper part of the body frame 10, and a pair of electric motors 84 (only one of them is visible in FIG. 1) are attached to either side wall of the gear box 82 with the output shaft of each electric motor 84 extending in the inboard direction. The gear box 82 accommodates a reduction gear unit (not shown in the drawings) therein, and a pair of output shafts extend from either side of the gear box 82 in the outboard direction behind the electric motors 84, and each output shaft is fitted with a drive pulley 86. The rotation of each electric motor 84 is reduced in speed by the reduction gear unit, and is transmitted to the corresponding drive pulley 86. An endless cogged belt 88 is passed around each drive pulley 86 and the corresponding driven pulley 80 in a torque transmitting relationship so that the two drive disks 70 may be individually and rotatively actuated by the respective electric motors 84.

A tail wheel arm 92 consisting of a bifurcated yoke member is pivotally supported by the lower support plates 16 at the bifurcated base ends via a pivot shaft 90 thereof extending laterally so that the tail wheel arm 92 may be tilted vertically about the base end thereof. The rear end or the free end of the tail wheel arm 92 supports a tail wheel 94 consisting of an omni wheel in a rotatable manner around a rotational center line extending in the fore and aft direction. An electric motor 96 is provided between the rear end of the tail wheel arm 92 and the tail wheel 94 to allow the tail wheel 94 to be selectively rotated about the rotational center line thereof. By thus actuating the electric motor 96, the vehicle may be steered in any desired direction. The tail wheel 94 includes a plurality of free rollers arranged around the periphery thereof, each free roller being rotatable around a rotational center line tangential to the periphery of the tail wheel 94 so that the tail wheel 94 may be dragged in the fore and aft direction without friction owing to the rotation of the individual free rollers engaging the road surface.

An electric box 98 accommodating electronic units such as an electronic control unit, a gyro sensor and motor drive unit is attached to the front end of the gear box 82. The electronic control unit controls the two electric motors 84 for the drive disks 70 to maintain the vehicle in an upright posture by executing a control process based on inverted pendulum control, and the electric motor 96 for the tail wheel 94 for the turning movement of the vehicle. The body frame 10 supports a battery for powering the electric motors 84 and 96 and the electronic units although not shown in the drawings.

When the two electric motors 84 for the drive disks 70 are rotated in the same direction at a same speed, the vehicle travels in the fore and aft direction owing to the rotation of the main wheel 30 around the laterally extending rotational center line thereof. At such a time, the driven rollers 60 on the main wheel 30 remain stationary in regard to the rotation thereof around the respective tangential lines.

When the two electric motors 84 for the drive disks 70 are rotated at a different speed or in different directions, the vehicle travels in an oblique direction owing to the lateral component of the drive force created by the rotation of the driven rollers 60 on the main wheel 30 which is in turn caused by the engagement between the drive rollers 78 and the driven rollers 60. When the rotational speeds of the electric motors 84 are the same but in the opposite directions, the vehicle is enabled to travel in the lateral direction owing to the rotation of the driven rollers 60 while the main wheel 30 remains stationary in regards to the rotation about the lateral axial line thereof.

Thus, by suitably actuating the electric motors 84 for the drive disks 70, the vehicle is able to travel linearly in any desired direction.

When the tail wheel 94 is rotatively actuated by the electric motor 96, the vehicle is caused to turn around a vertical line passing through the road contact point of the main wheel 30. In other words, any desired yaw movement of the vehicle may be achieved by suitably actuating the electric motor 96 for the tail wheel 94. Thus, by combining the control of the movement of the main wheel 30 and the control of the movement of the tail wheel 94, the vehicle is able to change both the travel direction and the heading of the vehicle at will.

Because the outer circumferential surface of the idler roller 102 engages the outer circumferential surface of the driven rollers 60 located in an upper part of the main wheel 30, the lateral movement of the main wheel 30, or in particular the lateral tilting of the main wheel 30 about the road contact point (roll movement) can be prevented. Thus, although the driven rollers 60 in the upper part of the main wheel 30 are not interposed by the drive rollers 78, the main wheel 30 is enabled to maintain the upright posture. Because the idler roller 102 is provided with the hourglass shape, the lateral tilting of the main wheel 30 can be prevented by the single idler roller 102.

Furthermore, the idler roller 102 is provided with the function to prevent the main wheel 30 from sagging down from the body frame 10 when the body frame 10 is lifted off the ground. Therefore, the vehicle can be easily lifted off the ground to carry the vehicle from one place to another or to load the vehicle onto a carrier vehicle.

Because the free rollers (guide rollers) 110 engage the driven rollers that are located in the front and rear parts of the main wheel 30 with respect to the vertical line passing through the ground contact point of the main wheel 30, the rotation of the main wheel 30 around the vertical line passing through the ground contact point of the main wheel 30 or the yaw movement of the main wheel 30 can be prevented. Furthermore, the free rollers 110 also contribute to the prevention of the roll movement of the main wheel 30 relative to the body frame 10 by restricting the lateral tilting of the main wheel 30 about the ground contact point. The free rollers 110 also prevent the pitch movement of the main wheel 30 relative to the body frame 10.

Because the free rollers 110 receives the loading of the rider seated on the saddle via the body frame 10 and the support shaft 22, similarly as the drive rollers 78, a corresponding contact pressure is created between the free rollers and the driven rollers 60 of the main wheel 30. Therefore, the free rollers 110 are particularly effective in preventing the yaw movement, the roll movement and the pitch movement of the main wheel 30.

Because the arm 106 can tilt about the support shaft 22, even when the body frame 10 should tilt about the support shaft either in the forward or rearward direction, owing to the rotation of the arm 106 about the support shaft 22, the free rollers 110 are prevented from being pressed against the driven rollers 60 with excessive force.

As discussed earlier, each drive disk 70 of the illustrated embodiment is an assembly of the hub 72, the disk member 74 and the holder beams 76. Each holder beam 76 is attached to the hub 72 at the first rod segment 76A thereof and to the disk member 74 at the second rod segment 76B so that the assembly is easy to assemble and is highly robust against external forces. As each drive roller 78 is supported by the adjoining holder beams 76 via a roller shaft (pivot shaft) 116 which is supported by the holder beams 76 at the respective end parts thereof, the drive roller 78 can be supported in a mechanically stable manner. Also, as the holder beams 76 are detachably attached to the hub 72 and the disk member 74, the drive disk 70 can be manufactured without requiring any complex machining or delicate assembly work.

The assembly work of the holder beams 76 can be facilitated by using a suitable jig that temporarily holds the holder beams 76 and the drive rollers 78 together when attaching the holder beams 76 to the hub 72 and the disk member 74.

As the arrangement for supporting the drive rollers 78 requires only the small simple components (the holder beams 76), instead of a large complex holder member which is provided with a complex arrangement for holding a plurality of drive rollers thereto, the manufacturing cost can be drastically reduced.

As the holder beams 76 can be attached to the hub 72 and the disk member 74 by using the threaded bolts 112 and 114, the assembly work for the drive rollers 78 can be accomplished both easily and in an efficient manner. Also, servicing work such as replacing the drive rollers 78 can be accomplished without any difficulty.

Figure 9:
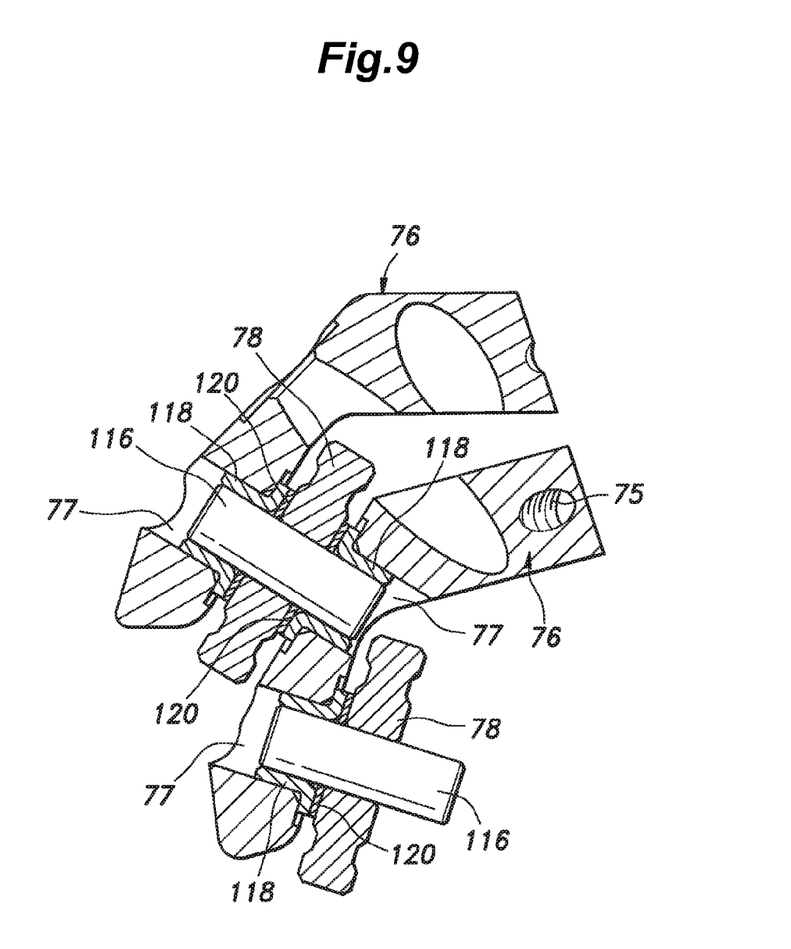
FIG. 9 is a view similar to FIG. 7 showing an alternate embodiment of the drive disk assembly.

When any axial play that may exist between each holder beam 76 and the adjoining drive roller 78, a shim 120 made of plastic material may be interposed between the flange of the bush 118 and the drive roller 78 as shown in FIG. 9. By removing such an axial play, the noise of the propulsion device during operation can be minimized.

Although the present invention has been described in terms of preferred embodiments thereof, it is obvious to a person skilled in the art that various alterations and modifications are possible without departing from the scope of the present invention. For instance, the mode of attaching the holder beams 76 is not limited to threaded bolts, but may also include other fasteners such as rivets and clips which are preferably reusable for the convenience of servicing. In the illustrated embodiment, the contact circles of the drive disks and the main wheel were different in diameter (D1<D2) in the illustrated embodiment, but may also be the same (D1=D2) without departing from the spirit of the present invention.

The invention claimed is:

1. A frictional propulsion device, comprising:
a frame;
a main wheel including an annular core member having a laterally extending central axial center line and a plurality of driven rollers each rotatably supported on the annular core member about a tangential line of the annular core member;
a support shaft supported by the frame and extending laterally across a hollow interior of the main wheel;
a pair of drive disks rotatably supported by the support shaft on either side of the main wheel, the drive disks being individually rotatable around a common central axial line; and
a plurality of drive rollers arranged along a peripheral part of each drive disk and each rotatably supported by the drive disk about a rotational center line at an angle with respect to both a tangential line of the drive disk and the rotational center line of the drive disk, at least part of the drive rollers engaging the driven rollers of the main wheel;
wherein each drive disk includes,
a hub rotatably supported by the support shaft,
a disk member attached to a peripheral part of the hub, and
a plurality of holder beams arranged circumferentially between the hub and the disk member such that each holder beam is attached to the hub at a first end thereof and to the disk member at a second end thereof, each drive roller being rotatably supported by a corresponding adjoining pair of holder beams,
wherein each holder beam is detachably attached to the hub and the disk member by using fasteners.

2. The frictional propulsion device according to claim 1, wherein the holder beams are identically shaped to one another, and are same in number as the drive rollers.

3. An omni-directional vehicle, comprising:
the frictional propulsion device according to claim 1; and
a drive unit supported by the frame and configured to rotationally drive the two drive disks individually.

4. A frictional propulsion device, comprising:
a frame;
a main wheel including an annular core member having a laterally extending central axial center line and a plurality of driven rollers each rotatably supported on the annular core member about a tangential line of the annular core member;
a support shaft supported by the frame and extending laterally across a hollow interior of the main wheel;
a pair of drive disks rotatably supported by the support shaft on either side of the main wheel, the drive disks being individually rotatable around a common central axial line; and
a plurality of drive rollers arranged along a peripheral part of each drive disk and each rotatably supported by the drive disk about a rotational center line at an angle with respect to both a tangential line of the drive disk and the rotational center line of the drive disk, at least part of the drive rollers engaging the driven rollers of the main wheel;
wherein each drive disk includes,
a hub rotatably supported by the support shaft,
a disk member attached to a peripheral part of the hub, and
a plurality of holder beams arranged circumferentially between the hub and the disk member such that each holder beam is attached to the hub at a first end thereof and to the disk member at a second end thereof, each drive roller being rotatably supported by a corresponding adjoining pair of holder beams, and
wherein each hub includes a cylindrical part rotatably supported by the frame and a radial flange extending radially outward from an outer periphery of the cylindrical part, each holder beam being connected between the radial flange of the hub and the disk member.

5. The frictional propulsion device according to claim 4, wherein each holder beam consists of an elongated rod member, and the first end and the second end of the rod member abut a first position on the flange of the hub and a second position on the disk member, respectively, at respective axial end surfaces of the rod member.

6. The frictional propulsion device according to claim 5, wherein the first position and the corresponding second position are offset relative to each other in both radial and circumferential directions.

7. The frictional propulsion device according to claim 6, wherein the end surface of the first end of the holder beam is provided with a first female thread hole, and a first screw is passed through a hole provided in the flange of the hub and threaded into the first female thread hole, and wherein the end surface of the second end of the holder beam is provided with a second female thread hole, and a second screw is passed through a hole provided in the disk member and threaded into the second female thread hole.

8. The frictional propulsion device according to claim 4, wherein the flange and the disk member are substantially parallel to each other.

9. An omni-directional vehicle, comprising:
the frictional propulsion device according to claim 4; and
a drive unit supported by the frame and configured to rotationally drive the two drive disks individually.

10. A frictional propulsion device, comprising:
a frame;
a main wheel including an annular core member having a laterally extending central axial center line and a plurality of driven rollers each rotatably supported on the annular core member about a tangential line of the annular core member;
a support shaft supported by the frame and extending laterally across a hollow interior of the main wheel;
a pair of drive disks rotatably supported by the support shaft on either side of the main wheel, the drive disks being individually rotatable around a common central axial line; and
a plurality of drive rollers arranged along a peripheral part of each drive disk and each rotatably supported by the drive disk about a rotational center line at an angle with respect to both a tangential line of the drive disk and the rotational center line of the drive disk, at least part of the drive rollers engaging the driven rollers of the main wheel;

wherein each drive disk includes,
a hub rotatably supported by the support shaft,
a disk member attached to a peripheral part of the hub, and
a plurality of holder beams arranged circumferentially between the hub and the disk member such that each holder beam is attached to the hub at a first end thereof and to the disk member at a second end thereof, each drive roller being rotatably supported by a corresponding adjoining pair of holder beams, wherein an intermediate part of each holder beam is provided with a pair of bearing holes for rotatably supporting pivot shafts of the adjoining drive rollers, and wherein a flanged bush is inserted in each bearing hole, and a side face of each drive roller is supported by a flange of the flanged bush.

11. The frictional propulsion device according to claim 10, wherein a shim is positioned between the opposing surfaces of the flange and the drive roller.

12. An omni-directional vehicle, comprising:
the frictional propulsion device according to claim 10; and
a drive unit supported by the frame and configured to rotationally drive the two drive disks individually.

* * * * *